July 13, 1954

C. B. STRANDGREN 2,683,379

SCREW-THREADED MECHANISM

Filed July 7, 1950

Inventor:
Carl Bruno
STRANDGREN
by: J. Delatter Seguy
Attorney

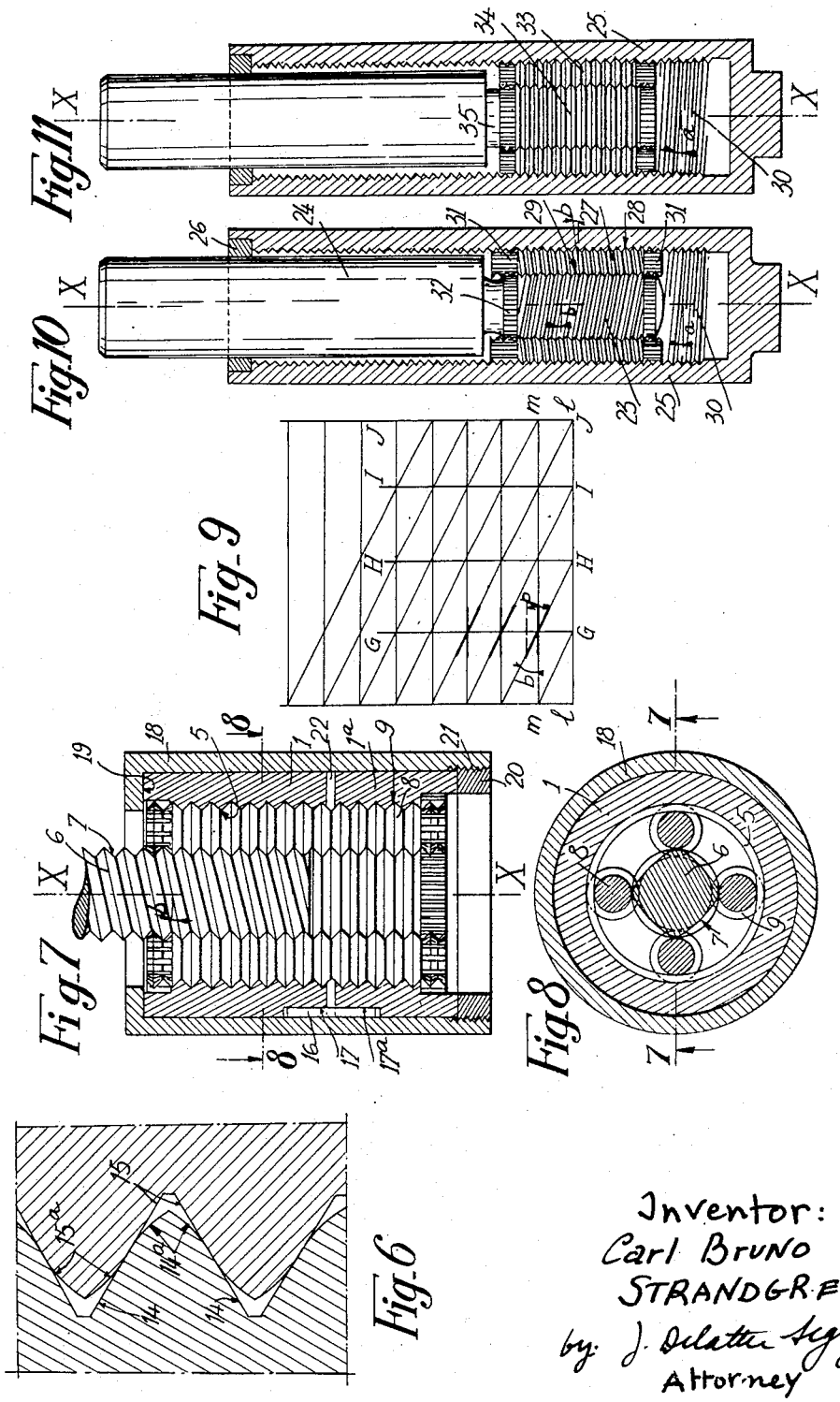

Patented July 13, 1954

2,683,379

UNITED STATES PATENT OFFICE 2,683,379

SCREW-THREADED MECHANISM

Carl Bruno Strandgren, Paris, France

Application July 7, 1950, Serial No. 172,510

Claims priority, application France July 13, 1949

12 Claims. (Cl. 74—424.8)

A roller bearing arrangement has already been proposed which constitutes a nut and screw device and which comprises two co-axial portions, one female and the other male, which are adapted for a relative rotary movement and between which are disposed a plurality of ribbed or threaded rollers, the ribs or threads of these rollers engaging with corresponding threads provided on the inner face of the external female portion and the outer face of the internal male portion, the ribs or threads of said portions and rollers being inclined with respect to a direction parallel to the longitudinal axis of said arrangement and said rollers transforming into practically pure rolling movements the movements which, without the rollers, would be frictional movements between the co-operating surfaces then in contact of the internal and external portions.

In this known arrangement, in which the frictions and consequently the power dissipated by said frictions and also the risk of seizure are greatly reduced, the internal and external portions undergo, by reason of their relative rotary movement, a relative longitudinal displacement, which is a direct function of the algebraical sum of the inclinations of their ribs or threads. However, the inclination (spiral angle) of the threads of the rollers differs from those of the two portions and there occurs an axial displacement of these rollers with respect to both of these portions. This disadvantage is overcome in the roller bearing arrangement of the present invention.

The present invention has for its object to provide an improved arrangement of this nature. This arrangement is characterised in that the ribs or threads of the rollers have the same angle of inclination with respect to a direction parallel to the longitudinal axis of the arrangement as the ribs or threads of one of the two portions between which these rollers are situated.

Owing to equality of the angles of inclination between the rollers and the said portion, the rollers in the course of operation of the device are not subjected to longitudinal displacement of any kind in relation to such portion.

Other features will become apparent from the following description.

In the accompanying drawing, which is given solely by way of example.

Fig. 6 is a sectional view of a modification of the thread or rib profiles;

Fig. 7 is a longitudinal section, taken along the line 7—7 of Fig. 8, of a modification in which the rollers and the external female portion (portion constructed in two separate parts connected by key means) are provided with parallel annular ribs having an angle of inclination equal to 90° with respect to the longitudinal axis;

Fig. 8 is a cross-section along the line 8—8 in Fig. 7;

Fig. 9 is a diagram showing the positions which may be occupied by the lines of contact of the roller shown in Fig. 7;

Fig. 10 is a longitudinal section through a modification, in which the rollers are immobilised longitudinally with respect to the internal portion, the angle of inclination (spiral angle) of the screw threads of this internal portion and of the rollers with respect to the longitudinal axis being equal;

Fig. 11 is a similar section in which the internal portion and the rollers are provided with parallel annular ribs having an angle with respect to the longitudinal axis equal to 90°.

Figure 1:
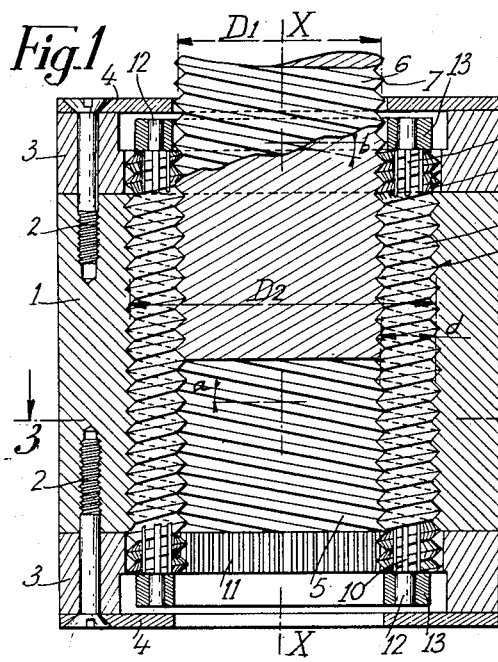
Fig. 1 is a longitudinal vertical section taken along the line 1—1 in Fig. 2 of an arrangement according to the invention, in which the threads on the rollers have the same angle of inclination as the threads on the external female portion forming the nut.
Figure 2:
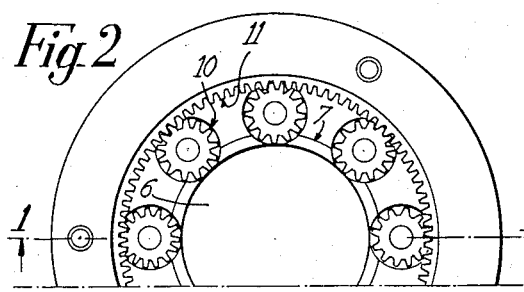
Fig. 2 is a corresponding plan view, the end supporting plate and also the annular bracing connecting the rollers being removed.
Figure 3:
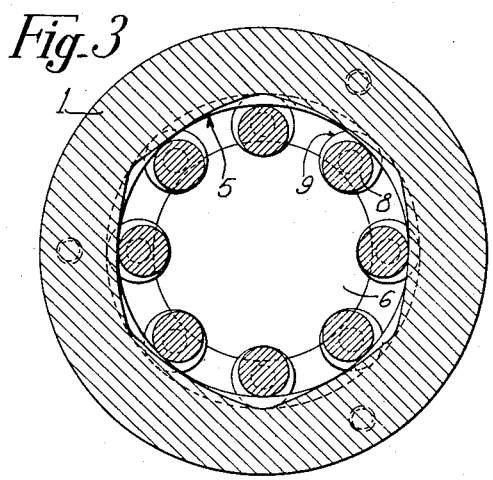
Fig. 3 is a cross-section taken on the line 3—3 in Fig. 1.

According to the embodiment illustrated in Figs. 1 to 3 the arrangement comprises an external female portion forming a nut 1, at the ends of which there are secured, by the aid of screws 2, two annular portions 3 and two end plates 4. This assembly is one for revolution about the longitudinal axis X—X. The nut 1 is provided internally with helical ribs or screw threads 5, possessing with respect to a plane perpendicular to the axis X—X a lead angle $a$, and consequently with said axis X—X a spiral angle $$\left(\frac{\pi}{2}-a\right)$$

Along the axis X—X, i. e., coaxially with the nut 1, there is disposed a screw 6 having helical ribs or screw threads 7. The latter have a section of the same profile and the same dimensions as screw threads 5 of the nut 1. Furthermore, they have with respect to axis X—X and to a plane perpendicular to said axis respectively a spiral angle $$\left(\frac{\pi}{2}-b\right)$$

and a lead angle $b$; these angles may be equal to or different from the angles $$\left(\frac{\pi}{2}-a\right)$$

and $a$ respectively of the screw threads 5 of the nut 1. In the example given the angles $a$ and $b$ have been shown as having the same absolute value, but the pitches are of reverse direction. The screw 6 and the nut 1 include a plurality of threads. In the following the number of threads of the screw 6 is designated $n_1$, and the number of threads of the nut is designated $n_2$.

The effective diameter $D_1$ of the screw 6 (Fig. 1) is less than the effective diameter $D_2$ of the nut 1, so that between the two portions 1 and 6 there is an annular free space in which are disposed rollers 8 each having one helical rib or thread 9 of the same section as the threads of the nut and the screw. The effective diameter $d$ of each roller is such that it corresponds exactly to $$\frac{D_2-D_1}{2}$$

Furthermore, the screw thread 9 of each roller has the same spiral angle $$\left(\frac{\pi}{2}-a\right)$$

with respect to its longitudinal axis as the threads 5 of the nut 1.

The rollers cannot be provided in any desired number nor in any desired position. Their maximum number N is equal to $|n_2-n_1|$, $n_2$ and $n_1$ being the number of threads of the nut and of the screw, because these rollers must be disposed in such a manner that a radial plane passing through the axis X—X of the device and through the axis of a roller cuts the profiles of the nut, the roller in question and the screw, in such a way that these profiles coincide.

It will be understood that, for the sake of equilibrium, the number of rollers may not be less than three.

In the event in which $n_2=n_1$ in absolute value, $n_2-n_1=0$, the threads being unidirectional and their numbers being equal, any desired number of rollers may be employed.

Figure 4:
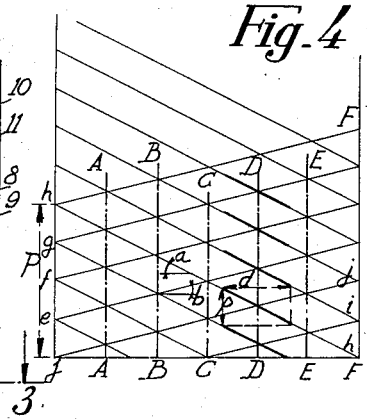
Fig. 4 is a diagram showing determination of the number of rollers and of their position in relation to the screw threads of the internal and external portions.

Reference will be made to Fig. 4, which shows diagrammatically the evolution of a cylindrical reference surface which is co-axial to the axis X—X and on to which are projected radially the bases of the thread grooves of the nut and the screw. The nut is assumed to comprise, for example, four threads to the left ($n_2=4$). These threads are represented by the four straight lines $ee$, $ff$, $gg$, $hh$, whilst the screw 6 is assumed to comprise two threads to the right ($n_1=-2$), represented by the straight lines $ii$ and $jj$. The lines $ee$ to $hh$ have an angle $a$, which corresponds to the lead angle of the threads of the nut, whilst the lines $ii$ and $jj$ have an angle $b$ corresponding to the lead angle of the threads of the screw.

It will be seen that these lines intersect along parallel lines AA, BB, CC, DD, EE, FF, which correspond to the intersection of radial axial planes with the cylindrical reference surface. Along these lines, i. e., in these radial planes, the profiles of the nut 1 and of the screw 6 coincide, and it is possible to place in these radial planes the axes of the rollers which in consequence will conveniently engage with the nut and the screw. The diagram shows that there are six possible positions for the rollers, which confirms the law $$N=|n_2-n_1|=|4-(-2)|=6$$

As regards the diameter $D_2$ of the nut and $d$ of the rollers, it is a very simple matter to establish the relation thereof by proceeding from the lead angle $a$, which is the same as regards the nut and the rollers. Consequently tg $a$ has the same value as regards the nut and each roller.

With regard to the nut, P being the pitch of the nut, and this pitch being equal to $n_2$ times the pitch $p$ of the roller which has only one thread, there is obtained $$\text{tg } a=\frac{P}{\pi D_2}=\frac{n_2 p}{\pi D_2}$$

As regards the roller, there is obtained $$\text{tg } a=\frac{p}{\pi d}$$

By taking the two values to be equal there is obtained $$\frac{n_2 p}{\pi D_2}=\frac{p}{\pi d}$$

from which is derived $$\frac{D_2}{d}=n_2$$

It is interesting to note that $n_2$ should be at least equal to 3, since as regards $n_2=2$ there would be obtained $$d=\frac{D_2}{2}$$

and there would not be room for the screw.

These conditions being fulfilled, when the screw 6 turns about the axis X—X in relation to the nut 1, the rollers 8 engage exactly at the one time with the nut and with the screw. Moreover, if these rollers 8 roll without sliding in the nut 1 they are, by reason of this rolling movement, not subjected to any kind of longitudinal displacement in relation to the nut, since at each moment and with respect to all positions of the rollers about the nut there is strict coincidence between the profiles of the thread 9 of each roller 8 and the threads 5 of the nut 1, by reason of the identity between their angles of inclination.

With a view to avoiding a sliding of the rollers 8 in relation to the nut, for the relation displacement between these parts in the circumferential direction must be simply a rolling movement, each roller forms at each end at 10 a pinion, the teeth of which are cut longitudinally through the thread 9. The pinions 10 mesh with one or the other of two toothed rims 11 provided in the end annular portions 3, secured to the nut 1.

Finally, for the purpose of facilitating mounting, the rollers 10 are extended by plain studs 12 engaging in two bracing rings 13, which are prevented from falling from the studs 12 by the end plates 4, the assembly of the rings 13 and the rollers 8 being roughly in the form of a cage.

The profiles of the threads may be of any desired kind. Advantage will be found, however, in adopting one of the solutions illustrated in Figs. 5 and 6.

Figure 5:
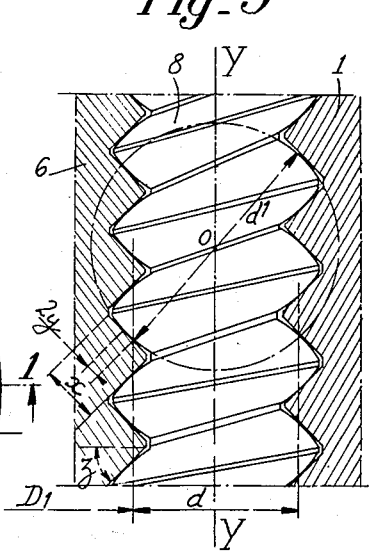
Fig. 5 is a partial section showing an example of the thread or rib profiles of the different parts.

According to the embodiment illustrated in Fig. 5, the ribs or threads of the nut 1 and the screw 6 have a triangular profile, whilst each half-profile of the thread of the roller 8 is an arc of a circle having the radius $d_1$ and the centre O located on the axis Y—Y of the roller.

According to the modification illustrated in Fig. 6, the ribs or threads of the nut and of the screw comprise a triangular base 14 and a pointed apex 14a, the same being the case with respect to the rib or thread of the roller, which comprises a triangular base 15 and a pointed apex 15a.

In the two cases the width $x$ of the sides of the ribs or threads will be selected in accordance with the following considerations:

It is known that the maximum load P, expressed in kg., which a point of contact is capable of supporting, is $$P = C \frac{\Delta^3 r^2}{E^2}$$

in which

C is a coefficient equal to 11.6,
$\Delta$ is the Brinell hardness in kg. per sq. mm.,
E is the modules of elasticity in kg. per sq. mm.,
$r$ is the radius of curvature.

Under the effect of this load there is an elastic deformation at the point of contact between the ribs or threads and the bearing surface taking the form of a small circle having the radius $y$ (Fig. 5), with the value $$y = 1.11 \sqrt[3]{\frac{Pr}{E}} = 1.11 \sqrt{C} \frac{\Delta r}{E} = 2.4 \frac{\Delta r}{E}$$

As regards the screw, in which the unitary forces are the highest:

$$r = K d_1 \frac{D_1}{D_1 + Kd}$$

in which

K is a coefficient selected at will and lower than 1,
$d_1$ is the diameter of the circle having the centre O,
$D_1$ is the diameter of the screw,
$d$ is the diameter of the roller.

By substituting this value of $r$ in the formula for $y$ above it is possible to calculate $y$.

This being granted, experience has shown that good results as regards the behaviour of the device are obtained by taking for the width $x$ $$y \leqq \frac{x}{4}$$

being $x \geqq 9.6 K \frac{\Delta}{E} d_1 \frac{D_1}{D_1 + Kd}$

Finally, as regards the angle $z$ (Fig. 5), formed by a flank of the thread with a plane perpendicular to the axis X—X, a relatively simple calculation shows that the optimum angle is one of 42°. In point of fact this angle may, without serious inconvenience, be comprised between 42°±12°.

The conditions being fulfilled, there is obtained an assembly in which the forces to which it is subjected do not cause any undue strain. Experience has shown that an arrangement is obtained practically without friction. The rotation of the screw or male member is of an extreme smoothness which is wholly surprising. Some slight idea thereof can be obtained by considering that in a device having substantially the dimensions as in Fig. 1, when disposed vertically on a flat support, the screw or male member commences to turn under the action of the force of gravity and accelerates with such rapidity that it appears to be slipping freely through the nut or female member. The same arrangement, with the nut or female member being held in the hand and the screw or male member projecting below the nut, and the screw being pressed with its pointed or rounded end against a hard surface, simply with the pressure capable of being exercised by the hand, the screw is set into rotation and assumes an acceleration such that by inertia, after its point has been moved towards the interior of the nut, the movement of the screw continues and the latter is ejected automatically upwards out of the nut.

In these circumstances it is unnecessary to emphasize the enormous interest to be attached to an arrangement of this nature, which is practically devoid of friction, on all occasions when it is required to transmit considerable forces, particularly in the case of machine tools.

In Figs. 7 and 8 there is shown a modification in which the external portion is made of two parts 1 and 1a keyed one in relation to the other about the axis $x$—$x$ by the aid of one or more longitudinal keys 16 engaging in longitudinal grooves 17 and 17a provided in coincidental fashion in the parts 1 and 1a. These parts are urged axially one towards the other by the combination of a sleeve 18, which surrounds the same and against a shoulder 19 of which there bears at the end the part 1, and a nut 20 screwed at 21 into the opposite end of this sleeve, the nut 20 bearing against the end portion of the part 1a. Between these two parts there is provided a slight clearance 22.

Owing to this method of mounting it is possible to eliminate play between the threads 7 of the screw, the parallel annular ribs of the parts 1 and 1a and the parallel annular ribs 9 of each roller 8. It will be understood that this construction is also applicable to the embodiment shown in Figs. 1 to 3.

In this modification according to Figs. 7 and 8, the parts 1 and 1a and the rollers 8 are provided with parallel annular ribs having an angle with respect to the longitudinal axes of said parts and rollers equal to 90°. On the other hand the screw 6 is provided with a helical rib or screw thread 7 having a spiral angle equal to $$\left(\frac{\pi}{2} - b\right)$$

i. e. a lead angle equal to $b$.

The diagram of Fig. 9, in which the horizontal lines such as $ll$, $mm$ and so forth represent the parallel annular ribs of the nut and the rollers, shows that with a screw comprising four screw threads represented by the oblique lines it is possible to dispose four rollers, the lines of contact GG, HH, II and JJ of which pass through the points of intersection of the horizontal lines and the oblique lines. The number of rollers is always:

$$N = |n_1 - n_2| = |0 - 4| = 4$$

Fig. 10 illustrates a further modification, in which the screw 23 is secured to the end of a piston 24, which slides in an extension of the external portion 25, a tight joint 26 being provided at the end of this portion. Each roller 27 comprises a helical rib or screw thread 28 having the same lead angle $b$ as that 29 of the male member or screw 23, whilst the helical ribs or screw threads 30 of the external portion or female member 25 have a different lead angle $a$.

In this case the rollers 27 are not subjected to longitudinal displacement in relation to the screw 23, whilst the assembly of screw and rollers is displaced longitudinally along the axis X—X in relation to the external portion in proportion to the algebraical sum (tg $a$+tg $b$). Any sliding of the rollers 27 with respect to the screw is rendered impossible owing to the end pinions 31, which mesh with the straight teeth 32 provided at the two ends of the screw.

Fig. 11 illustrates a similar modification wherein, however, the rollers and the screw 35 are provided with parallel annular ribs situated in planes perpendicular to the longitudinal axis X—X, whilst the external portion 23 is provided with helical ribs or screw threads having, as in the case of the previous embodiment, a lead angle $a$.

In all of these cases, owing to the rollers interposed between the external portion or female member and the central portion or male member, friction is practically suppressed, which considerably reduces the work necessary to turn the internal portion in relation to the external portion.

Although specific embodiments of the invention have been described hereinbefore, it is to be understood that many changes and modifications may be made therein without departing from the spirit of the invention or the scope of the appended claims.

Having now described my invention what I claim as new and desire to secure by Letters Patent is:

1. A screw and nut mechanical movement comprising in combination: a female member the inner surface of which is cylindrical and ribbed, a male member located in the female member, the outer surface of the male member being cylindrical, coaxial with said inner surface and ribbed, the ribbing having substantially the same profile and the same pitch as the ribbing of said inner surface and the diameter of this outer surface being less than that of said inner surface so that an annular space is provided between said surfaces, a plurality of cylindrical ribbed rollers located in said annular space, the longitudinal axes of said rollers being parallel to the common axis of said coaxial surfaces, the ribbing of said members and rollers being inclined with respect to a direction parallel to said common axis, the ribbing of said rollers engaging the ribbing of both said members and having the same angle of inclination with respect to said direction as the ribbing of one of said members, the ribbing of at least one of the members being in the form of at least one screw thread, and means to maintain a constant circumferential spacing between said rollers.

2. A screw and nut mechanical movement comprising in combination: a female member the inner surface of which is cylindrical and ribbed, a male member located in the female member, the outer surface of the male member being cylindrical, coaxial with said inner surface and ribbed, the ribbing having substantially the same profile and the same pitch as the ribbing of said inner surface and the diameter of this outer surface being less than that of said inner surface so that an annular space is provided between said surfaces, a plurality of cylindrical ribbed rollers located in said annular space, the longitudinal axes of said rollers being parallel to the common axis of said coaxial surfaces, the ribbing of said members and rollers being inclined with respect to a direction parallel to said common axis, the ribbing of said rollers engaging the ribbing of both said members and having the same angle of inclination with respect to said direction as the ribbing of one of said members, the ribbing of at least one of the members being in the form of at least one screw thread, and the rollers being provided with auxiliary gear teeth substantially parallel to the roller axes and taking part in the rotation of the rollers, and a toothed ring provided at at least one end of the member the ribbing of which has the same angle of inclination as the ribbing of the rollers, said ring being adapted to rotate with the latter member at its speed and said gear teeth meshing with this ring to maintain a constant circumferential spacing between the rollers and avoid any circumferential slip of the rollers with respect to said member.

3. A screw and nut mechanical movement comprising in combination: a female member the inner surface of which is cylindrical and ribbed, a male member located in the female member, the outer surface of the male member being cylindrical, coaxial with said inner surface and ribbed, the ribbing having substantially the same profile and the same pitch as the ribbing of said inner surface and the diameter of this outer surface being less than that of said inner surface so that an annular space is provided between said surfaces, a plurality of cylindrical ribbed rollers located in said annular space, the longitudinal axes of said rollers being parallel to the common axis of said coaxial surfaces, the ribbing of said members and rollers being inclined with respect to a direction parallel to said common axis, the ribbing of said rollers engaging the ribbing of both said members and having the same angle of inclination with respect to said direction as the ribbing of one of said members, the ribbing of at least one of the members being in the form of at least one screw thread, the rollers being provided adjacent their ends with auxiliary gear teeth that are substantially parallel to the roller axes and said rollers terminating in the form of cylindrical stubs, two toothed rings rigidly secured at the ends of the member the ribbing of which has the same angle of inclination as that of the rollers, said gear teeth meshing with these rings, and two free rings which are coaxial to said common axis and in which the stubs of the rollers are rotatably mounted and form with said free rings a lantern-like structure.

4. A screw and nut mechanical movement as claimed in claim 2, wherein said gear teeth form one piece with said rollers.

5. A screw and nut mechanical movement as claimed in claim 2, wherein said ring is rigidly secured to the member the ribbing of which has the same angle of inclination as the ribbing of the rollers.

6. A screw and nut mechanical movement comprising in combination: a female member the inner surface of which is cylindrical and provided with at least one screw thread, a male member located in the female member, the outer surface of the male member being cylindrical and coaxial with said inner surface and provided with at least one screw thread, said screw threads having substantially the same profile and the same pitch, the helix angle of the screw thread on said outer surface being different from that of the screw-thread on said inner surface, the diameter of said outer surface being smaller than the diameter of said inner surface so that an annular space is provided between said surfaces, at least three cylindrical rollers, said rollers being located in said annular space and having their longitudinal axes parallel to the common axis of said coaxial surfaces and each being provided with a single screw thread which engages the screw threads of said members and has the same helix angle as the screw thread of one of said members, and means to lock said rollers in rotation to this latter member so as to prevent circumferential slip between this member and the rollers.

7. A screw and nut mechanical movement as claimed in claim 6 wherein the screw thread of the rollers has the same helix angle as the screw thread of the male member.

8. A screw and nut mechanical movement as claimed in claim 6, wherein said means comprises auxiliary gear teeth that are substantially parallel to the roller axes and are provided adjacent the ends of said rollers, two toothed rings rigidly secured to the ends of the member the screw thread of which has the same helix angle as the screw thread of the rollers, said gear teeth meshing with these rings, and said mechanical movement further comprising cylindrical stubs provided at the ends of said rollers, and two free rings coaxial to said common axis in which said stubs are rotatably mounted and form therewith a lantern-like structure.

9. A screw and nut mechanical movement as claimed in claim 6 wherein the number of screw threads provided on the female member is at least three and the thread on said rollers has the same helix angle as these three threads.

10. A screw and nut mechanical movement comprising in combination: a female member the inner surface of which is cylindrical and provided with at least one screw thread, a male member located in the female member, the outer surface of this male member being cylindrical, coaxial with said inner surface and provided with a series of parallel annular ribs inclined at 90° to the axis, these ribs having substantially the same profile and the same pitch as the screw thread of the female member, the diameter of this outer surface being less than that of said inner surface so that an annular space is provided between said surfaces, a plurality of cylindrical rollers located in said annular space, the longitudinal axes of said rollers being parallel to the common axis of said coaxial surfaces, said rollers being provided with a series of parallel annular ribs which are inclined at 90° to the axes of the rollers and are adapted to engage the threads of said female member and the ribs of said male member, and means to maintain a constant circumferential spacing between said rollers.

11. A screw and nut mechanical movement comprising in combination: a female member the inner surface of which is cylindrical and provided with a series of parallel annular ribs inclined at 90° to the longitudinal axis of this member, a male member located in the female member, the outer surface of this male member being cylindrical, coaxial with said inner surface, and provided with at least one screw thread, this thread having substantially the same profile and the same pitch as the ribs provided on the female member, the diameter of this outer surface being less than that of said inner surface so that an annular space is provided between said surfaces, a plurality of cylindrical rollers located in said annular space, the longitudinal axes of said rollers being parallel to the common axis of said coaxial surfaces, said rollers being provided with a series of parallel annular ribs which are inclined at 90° to the axes of said rollers and are adapted to engage the threads of said male member and the ribs of said female member, and means to maintain a constant circumferential spacing between said rollers.

12. A screw and nut mechanical movement comprising in combination: a casing provided at one end with an annular abutment and at its other end with an internal screw thread, two female pieces keyed in said casing to slide longitudinally relative to one another so as to form an adjustable female member, the inner surfaces of said pieces being coaxial, having the same diameter, and being ribbed, a male member located in both said female pieces, the outer surface of said male member being cylindrical, ribbed and coaxial to the inner surfaces of said pieces, the ribbing of said male member having substantially the same profile and the same pitch as the ribbing of said pieces, the diameter of said outer surface being less than that of said inner surfaces so that an annular space is provided between said inner and outer surfaces, a plurality of cylindrical ribbed rollers located in said annular space, the longitudinal axes of said rollers being parallel to the common axis of said coaxial surfaces, the ribbing of said male member, female pieces, and rollers being inclined with respect to a direction parallel to said common axis, the ribbing of said rollers engaging the ribbing of said female pieces and the male member and having the same angle of inclination with respect to said direction as the ribbing of one of said members, and a nut which is screwed in said other end of said casing and bears against one of said female pieces whilst the other female piece bears against said annular abutment so that upon tightening said nut the ribbing of both said female pieces may be adjusted longitudinally of the rollers and tightened against the ribbing of the latter, and means to maintain a constant circumferential spacing between said rollers.

References Cited in the file of this patent

UNITED STATES PATENTS

| Number | Name | Date |
|---|---|---|
| 2,266,888 | McCurdy et al. | Dec. 23, 1941 |

FOREIGN PATENTS

| Number | Country | Date |
|---|---|---|
| 888,281 | France | Aug. 30, 1943 |